United States Patent
Greene et al.

(10) Patent No.: US 8,560,536 B2
(45) Date of Patent: Oct. 15, 2013

(54) METHODS, SYSTEMS, AND/OR APPARATUSES FOR USE IN SEARCHING FOR INFORMATION USING COMPUTER PLATFORMS

(75) Inventors: John Greene, Portland, OR (US); Luke Wroblewski, San Jose, CA (US); Aramys Miranda, San Jose, CA (US); Tim Rechin, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 270 days.

(21) Appl. No.: 12/722,232

(22) Filed: Mar. 11, 2010

(65) Prior Publication Data

US 2011/0225145 A1    Sep. 15, 2011

(51) Int. Cl.
   *G06F 17/30* (2006.01)
(52) U.S. Cl.
   USPC ........... 707/731; 707/706; 707/722; 707/736; 706/14
(58) Field of Classification Search
   None
   See application file for complete search history.

(56) References Cited

U.S. PATENT DOCUMENTS

| | | | |
|---|---|---|---|
| 5,987,448 A * | 11/1999 | Evans et al. | 1/1 |
| 6,584,460 B1 * | 6/2003 | Iwayama et al. | 1/1 |
| 6,944,612 B2 * | 9/2005 | Roustant et al. | 707/706 |
| 6,947,930 B2 | 9/2005 | Anick et al. | |
| 7,149,415 B2 * | 12/2006 | Thiagarajan et al. | 386/265 |
| 7,386,542 B2 * | 6/2008 | Maybury et al. | 707/733 |
| 7,636,714 B1 * | 12/2009 | Lamping et al. | 1/1 |
| 7,725,485 B1 * | 5/2010 | Sahami et al. | 707/767 |
| 8,185,526 B2 * | 5/2012 | Wen et al. | 707/730 |
| 2004/0225686 A1 * | 11/2004 | Li et al. | 707/104.1 |
| 2006/0026152 A1 * | 2/2006 | Zeng et al. | 707/5 |
| 2007/0192284 A1 * | 8/2007 | Finley et al. | 707/2 |
| 2008/0162433 A1 * | 7/2008 | Wolf | 707/3 |
| 2009/0234808 A1 * | 9/2009 | Zarzar et al. | 707/3 |
| 2009/0234811 A1 * | 9/2009 | Jamil et al. | 707/3 |
| 2009/0327275 A1 * | 12/2009 | Walker et al. | 707/5 |
| 2010/0082649 A1 * | 4/2010 | Gutt et al. | 707/758 |
| 2010/0094917 A1 * | 4/2010 | Vernau et al. | 707/821 |
| 2011/0047136 A1 * | 2/2011 | Dehn | 707/706 |
| 2011/0137883 A1 * | 6/2011 | Lagad et al. | 707/707 |

* cited by examiner

*Primary Examiner* — Hung Le
(74) *Attorney, Agent, or Firm* — Berkely Law & Technology Group, LLP

(57) ABSTRACT

Embodiments of methods, systems or apparatuses relating to data processing and more particularly to methods, systems, and/or apparatuses for use in searching for information are disclosed.

19 Claims, 4 Drawing Sheets

METHODS, SYSTEMS, AND/OR APPARATUSES FOR USE IN SEARCHING FOR INFORMATION USING COMPUTER PLATFORMS

BACKGROUND

1. Field

The subject matter disclosed herein relates to data processing and more particularly to methods, systems, and/or apparatuses for use in searching for information.

2. Information

Finding information stored or existing in digital form, such as in the form of binary digital signals, may sometimes be time-consuming given the plethora of information available. For example, finding information on the Internet, such as by selecting a hyperlink as presented on a web page, or by inputting a search query into an online search field, may result in a user being presented with a significant amount of information, some of which may be irrelevant or less relevant to the user. A user may have a somewhat similar experience while searching for information in other computer applications, such as, for example, a database and/or the like information repository.

With so much information existing and reposed in digital form, there is a continuing desire to provide useful techniques for searching for information in a more efficient or cost effective manner.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description with the accompanying drawings in which:

DETAILED DESCRIPTION

Figure 1:
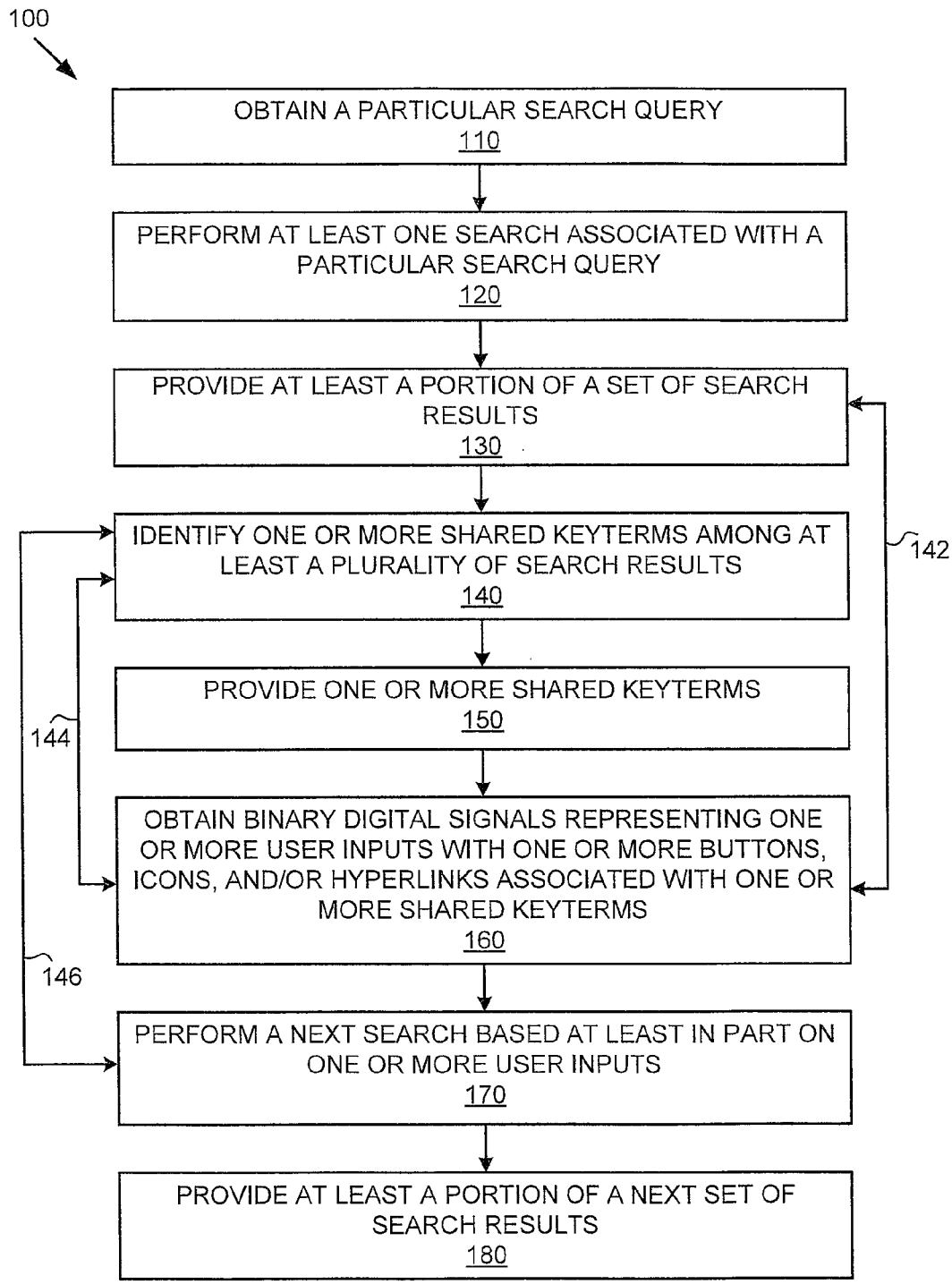
FIG. 1 is a flow chart depicting an example method for use in searching information, in accordance with an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description which follow are presented in terms of algorithms or symbolic representations of operations on binary digital signals which may be stored within a memory of a specific apparatus or special purpose computing device or platform. In the context of this particular specification, the term specific apparatus and/or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" or a "certain embodiment" means that a particular feature, structure, or characteristic described in connection with the embodiment is included in at least one embodiment of claimed subject matter. Thus, the appearances of the phrase "in one embodiment" or "an embodiment" or a "certain embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

As mentioned previously, there may be a desire to search for and identify information that a user may deem to be desirable in a more efficient or cost effective manner. Currently, for example, in an Internet context, such as on the World Wide Web, a user may interact with a web browser or other like capability to enter a search query into a search field in an attempt to identify information which the user believes may be relevant to locating desired information. Here, a resulting search query may be provided to a process or application, such as a search engine, for example, for processing. The search engine may then conduct a search (or possibly invoke other processes/applications to perform a search) to establish a set of "search results".

In this context, the phrase "search results" refers to information that may be provided, at least in part, to a user's computing platform and which may be processed and/or otherwise presented in some manner to the user. For example, in certain implementations search results may be processed to present a user with one or more selectable links (e.g., hyperlinks) associated with information located during the search. Such search results may include a summary or snippet, an image, and/or other like content from a web page or other like available document and/or data file. Such techniques are well known.

Figure 2:
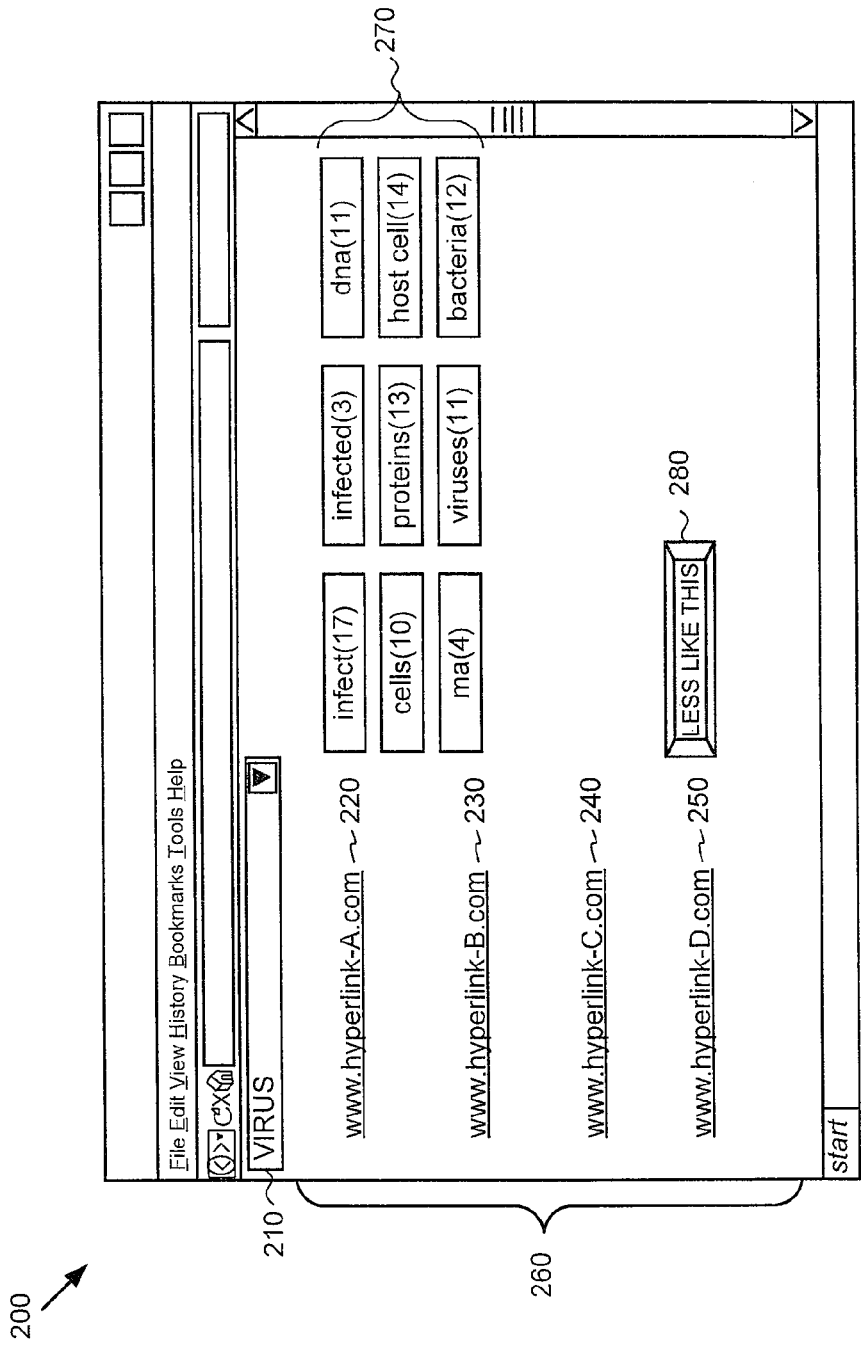
FIG. 2 is a schematic diagram illustrating an example of an user interactive display for use in searching information, in accordance with an embodiment.

FIG. 2 may serve as a helpful illustration. Web page 200 depicts a browser showing a portion of a web page associated with a search engine or other like service with exemplary search query field 210 and at least a portion of exemplary search results 260 thereon. In an embodiment, a user may input a search query into search query field 210, such as the search query "virus" as depicted in field 210, which may result in at least a portion of search results 260 (illustrated here by hyperlinks 220-250) being displayed. A user may subsequently access (e.g., operatively select) a particular hyperlink, such as hyperlink 220, for example. At least a portion of a source document or other like content associated with the selected search result may then be accessed and/or presented to the user in some manner.

Once accessed, a user may determine that the experience resulting from accessing hyperlink 220, may not be desirable and, as such, may selectively navigate back, or otherwise return, to web page 200. Similarly, a user may determine that the experience resulting from accessing hyperlink 220 may not be desirable and thus access another hyperlink, such as a hyperlink on displayed web page 200. A user may find the experience resulting from accessing a hyperlink undesirable because the content displayed may be less relevant or undesirable, as just some examples.

In certain instances, a user may be able to determine that a particular search result, or a plurality of search results, may not be relevant for the user based, at least in part, on viewing displayed summaries or abstracts associated with one or more search results and/or after accessing some or all of the information associated with the linked file(s). For instance, in certain embodiments, hyperlink 220 in FIG. 2 may be displayed with information, such as text or image information (not shown), which may provide a user with at least some indication as to the information that may be available via the associated hyperlink. Based, at least in part on this introduction to the available information, a user may decide to select one or more web pages or other like data files for further consideration. Conversely, given such introduction to the available information, a user may decide not to select certain hyperlinks since the user may have some indication that the identified web pages or other like source data files may lack relevance with regard to the information that the user desires.

If the search results as presented to and considered by a user appear to lack enough relevance to the desired information being sought, then a user may simply start a new search process by entering a new search query, as just an example. Such techniques and process of search refinement by a user are well known.

In certain search engines and/or other like searching tools, for example, a user may be provided with certain automated techniques that may assist the user in refining an existing search. For example, some search engines and/or the like allow a user to further refine an existing set of search results, for example, based on further terms or other like information. Here, for example, an additional search term or other like criteria may be added to selectively parse through or otherwise reduce an existing set of search results. Similarly, for example, some search engines dynamically suggest search terms as the user enters particular search terms. Some search engines, for example, present further search query terms that may be related and which upon selection of the hyperlink or other like feature initiate a search with the suggested related search term(s).

Further still, in some example search engines, a user may be presented with a selectable hyperlink or other like feature next to a given search result that upon selection initiates a subsequent search process based on the web address or URL associated with the search result. For example, one search engine presents a hyperlink stating "Similar" adjacent to a web address located below a summary or abstract of a search result. Upon selection, a refined search query may be automatically entered and a search initiated with such web address associated with the previously presented search result used in the search query but without the previous search terms. Here, for example, in response to an initial search query "California" a search engine may present a set of search results with one listing an address of "www.ca.gov/" having adjacent thereto a "Similar" link. Upon selection of the "Similar" link, a new set of search results may be presented resulting from a modified search query of "related: www.ca.gov/California", as just an example.

As mentioned, a user desiring search results that may be more relevant to the user may also take matters into his or her own hands and simply attempt to input another search query into online search field 210. The user's attempts to refine his or her search query (manually and/or with such suggested assistance) may be time-consuming. And, even in light of a user's subsequent attempts to input other search quires, the user may not find search results which pertain to what the user desires. Accordingly, other approaches or techniques may be desired.

With these and other concerns in mind, in accordance with certain aspects of the present description, some example implementations are presented which may include methods, systems, or apparatuses for establishing a set of search results based, at least in part, on an additional and/or refined search conducted based on user input (e.g., feedback) with regard to at least one previous set of search results. The additional and/or refined search may be based, for example, on a revised or new search query that may be established based, at least in part, on user input(s) identifying certain search results as being of a type and/or related in some manner to a type of information that is not desired.

Here, for example, a user may indicate via user input(s) that one or more search results in a previously established set of search results are not the type of results (e.g., information, source) that the user desires. For example, in certain embodiments, a selectable user feature may be presented that reads "Less like this" and which the user may activate to initiate or otherwise inform that in a subsequent (additional or refined) search this and possibly other similar search results should tend to be excluded and/or otherwise possibly avoided in some manner as such are not desired.

By way of example, in certain embodiments, based on such user input(s), one or more keyterm(s) and/or other like information that may be associated with one or more "non-desired" search results may be identified and used to establish a subsequent search query and/or set of search results. For example, one or more "shared" keyterms may be identified using all or part of an existing set of search results and a subsequent search conducted and/or set of search results established that tend to exclude and/or otherwise reduce a number of search results that may also be associated with such keyterms.

In certain embodiments, one or more keyterms may be identified in response to such user input(s) at a time after a search. This may, for example, be considered a post-input keyterm identification technique. In certain other embodiments, one or more keyterms may be identified in advance to such user input(s), for example, at a time of a search. This may, for example, be considered a pre-input keyterm identification technique. In certain other example embodiments a combination of pre-input and post-input keyterm identification techniques may be employed.

Thus, for example, a process, system and/or apparatus may implement a keyterm identification technique to identify one or more shared keyterms associated with one or more search results based, at least in part, on user input(s), wherein with a pre-input keyterm identification technique the user input(s) may include search query information, and with a post-input keyterm identification technique the user input(s) may further include information identifying one or more keyterms and/or information that may be processed to identify one or more keyterms that related to information that is not desired by the user.

In this context, the term "keyterm" refers to information that may be represented in alphanumeric strings that may be presented to a user, such as characters, numbers, symbols, etc., and/or even terms and/or phrases, which may be associated with a particular source document and/or file, such as textual information which may be used by a search engine or other like application for document or file identification, retrieval, and/or ranking. In certain implementations, for example, some keyterms may be provided with information about a source document, site, etc., such as, for example, in associated metadata and/or the like. In certain implementations, for example, some keyterms may be operatively associated with a source document, site, etc., but be maintained separately. In certain examples, keyterms may comprise machine-readable information that may serve to support subsequent searching in a similar manner as might an alphanumeric string, as just an example.

The phrases "shared keyterm" or "shared keyterms" refer to such information which may be common or shared in some manner among two or more of a plurality of search results in a set of search results. Shared keyterm(s), and in particular selection and use thereof, is explained in more detail below.

In certain embodiments, for example with a pre-input keyterm identification technique, shared keyterms, and/or selectable features associated with one or more shared keyterms, may be provided or presented, such as served, to a user as a part of at least a portion of a set of search results. Here, for example, a process, system and/or apparatus may obtain binary digital signals representing one or more user inputs, such as via a graphical user interface or other input device, with one or more shared keyterms, and/or selectable features which may be associated with such keyterms, which may be displayed therewith as a part of such a set of search results. Information associated with such user input(s) may then be used in a subsequent search.

In certain embodiments, for example with a post-input keyterm identification technique, one or more selectable features, such as one or more buttons, hyperlinks, and/or icons, as just some examples, associated with one or more search results may be presented to a user as a part of at least a portion of a set of search results. Information associated with such user input(s), such as user interaction(s) with one or more such selectable features, may then be used in a subsequent search to identify one or more shared keyterms which may then be used in a subsequent search.

FIG. 1 is a flow chart depicting an embodiment of a process 100 for establishing a set of search results based, at least in part, on user input(s) that may employ pre-input keyterm identification technique, post-input keyterm identification technique, and/or a combination thereof.

At block 110, a particular search query may be received or obtained, such as by a search application, for example, as input by a user into a search field via a graphical user interface, such as search query field 210 in FIG. 2. Here, a graphical user interface (GUI) may refer to a program interface that utilizes displayed graphical information to allow a user to control, operate, or otherwise interface with, a special purpose computing platform, for example, and/or other computing platforms, such as platforms which may be networked with a special purpose computing platform, or other devices. At block 110, for example, the search query may be provided by a user's client or other like computing platform over a network to one or more server or other like computing devices.

At block 120, in response to a search query at block 110, a search engine, process or application and/or the like may perform a search associated with that search query. At block 130, all or part of a set of search results, such as search results 260 in FIG. 2, may be provided to, or otherwise made accessible to, a user's computing platform so that such information based on such search results may be displayed in some manner to the user, as just an example.

Of course, in this exemplary embodiment, search results 260 are displayed to a user on web page 200 in an online environment. To be clear, however, in certain embodiments, one or more search engines, processes, or applications may operate or perform such a search and/or provide such results for offline applications, such as desktop search applications, as just an example. Accordingly, the scope of claim subject matter is not limited to function in particular environments, such as online or offline environments.

At block 140, a search engine, process, application, and/or the like, may identify one or more shared keyterms among at least a plurality of search results if a pre-input keyterm identification technique is employed. If a post-input keyterm identification technique is employed, one or more shared keyterms may be identified based on information associated with user input(s) obtained at block 160, e.g., as illustrated by the optional flow pattern identified by arrows 142, 144, and 146.

To illustrate an exemplary pre-input keyterm identification technique, at block 140 a search engine, process, application, and/or the like, may identify one or more keyterms for a set of search results based, at least in part, on search query information. Here, it is noted that there are a variety of different approaches or techniques to identify one or more keyterms for a set of search results which may take into account many different factors. Accordingly, so as to not obscure claimed subject matter, only a few exemplary approaches or techniques will be discussed. The scope of claimed subject matter, however, is not to be limited to these exemplary approaches or techniques. For instance, in certain embodiments, a search engine, process, application, and/or the like, may utilize one or more keyterm identification techniques described in U.S. Pat. No. 6,947,930, issued Sep. 20, 2005 to Peter G. Anick, Alastair Gourlay and John Thrall, and entitled "systems and methods for interactive search query refinement."

As a simplified example, in certain embodiments, a search engine, process, application, and/or the like, may iterate over a set of search results, such as iterating over one or more files or documents associated with such search results, to identify one or more keyterms associated with one or more search results. As described in the aforementioned patent, a set of candidate terms (the aforementioned patent refers to "candidate terms"; candidate terms may comprise keyterms in certain embodiments) associated with a document is constructed by comparing a term in the document to a master list of candidate terms. This comparing is repeated until a maximum number of terms in the document has been considered or a threshold number of unique terms has been considered. Then a weighting and/or selection function is applied to the set of candidate terms to produce a set of ranked candidate terms. In certain embodiments, such ranked candidate terms or portions thereof may comprise keyterms. Of course, so as not to obscure claimed subject matter, this simplified example depicts merely one way in which one or more keyterms may be identified. It is noted then that keyterm identification may be performed in numerous ways, all of which are encompassed within the scope of claimed subject matter. Accordingly, the scope of claimed subject matter is not to be limited. As just some additional examples, in certain embodiments, one or more keyterms may be identified based, at least in part, on their frequency in content associated with a particular search result and/or based, at least in part, on certain positional and/or contextual characteristics, as just some examples.

In addition, at block 140, a search engine, process, application, and/or the like, may identify one or more shared keyterms associated with a plurality of search results. For example, in FIG. 2, search results 260 may be provided by a search engine at least in part in response to a user executing a search for the search query "virus" which the user may have entered into search field 210. In certain embodiments, a search engine, process, application, and/or the like, may consider a plurality of search results, such as a plurality of search results 260, and at block 140 identify one or more keyterms shared among a plurality of search results 260. For example, suppose textual information associated with hyperlink 240 and hyperlink 250 comprise a keyterm "cells" as just an example. That is, content which may be associated with hyperlink 240 and 250, or content which may be accessible by accessing (e.g., operatively selecting) hyperlink 240 and 250 may comprise at least one instance of a keyterm "cells" and/or otherwise be associated in some manner to a keyterm "cells". Thus, the term "cells" may be a shared keyterm, in that the keyterm "cells" is present among a plurality of search results 260 (e.g., shared by hyperlink 240 and hyperlink 250).

In certain embodiments, to be considered a shared keyterm, a keyterm may match (e.g., textually match) two or more keyterms among a plurality of search results. For instance, as described above, the keyterm "cells" may be associated with hyperlink 240 and hyperlink 250. In certain embodiments, however, an exact match may not be necessary. For instance, in certain embodiments one or more keyterms may be processed, such as concatenated, parsed, or otherwise processed so that a similarity or dissimilarity may be determined. Here, as just an example, a keyterm "cell" for hyperlink 240 and a keyterm "cells" for hyperlink 250 may be identified as a shared keyterm, despite the fact that "cell" and "cells" to not textually match. While this serves as a simple example to illustrate that a textual match may not be used, it should also serve to illustrate that keyterm processing may be performed for such functions as to determine misspellings or errors, plurals, prefixes, suffixes, etc., and/or to determine semantic or linguistic similarity and/or dissimilarity, as just some examples. In other examples, keyterms may comprise computer-readable information which may be "matched" in various other manners (e.g., based on mathematical aspects and/or other like processes). Suffice it to say, in certain embodiments, a keyterm for a particular search result may be dissimilar in some respect to a keyterm for another search result yet may be considered as a shared keyterm.

As mentioned above, in certain embodiments, a search engine, process, application, and/or the like, may iterate over a plurality of search results and identify one or more shared keyterms among a plurality of search results. Here, to be clear, search results may include search results which may or may not be displayed or otherwise accessible to a user. For instance, a search engine, process, application, and/or the like, may process a vast quantity of search results to determine shared keyterms, where only a fraction of those search results may be displayed or otherwise accessible to a user.

For instance, suppose for sake of example, that a set of search results includes 1000 search results. In this example, a search engine, process, application and/or the like, may iterate over a fraction of such search results, such as 50 of the "top" or most relevant search results in that particular set of search results, to determine one or more shared keywords. Of course, this is merely one example. In certain embodiments, a search engine, process, application, and/or the like, may iterate over any portion and/or all search results in a set of search results to determine one or more shared keywords. Suffice it to say, there are numerous ways in which a search engine, process, application and/or the like, may determine one or more shared keywords and the scope of claimed subject matter is not limited to any particular approach.

Also, in certain embodiments, a search engine, process, application, and/or the like, may determine the number of instances a particular shared keyterm appears for a particular search result or a plurality of search results. For instance, a search engine, process, application, and/or the like, may determine that the keyterm "cells" appears seven (7) times for hyperlink 240 and the keyterm "cells" appears three (3) times for hyperlink 250. In certain embodiments, the number of times a particular shared keyterm appears for a plurality of search results may be totaled, as just an example.

In certain embodiments, the number of shared keyterms for a plurality of search results may be vast. Thus, in certain embodiments, a search engine, process, application, and/or the like, may identify one or more particular shared keyterms. Here, it is noted that there are a variety of different approaches or techniques to identify particular shared keyterms which may take into account many different factors. Accordingly, so as to not obscure claimed subject matter, only a few exemplary approaches or techniques will be discussed. The scope of claimed subject matter, however, is not to be limited to these exemplary approaches or techniques. For instance, in certain embodiments, a search engine, process, application, and/or the like, may determine a median shared keyterm. Here, for instance, the counting operation described above may allow for median shared keyterms to be determined among a plurality of search results.

For example, median shared keyterms may be advantageous for a variety of reasons. To illustrate, a keyterm common to all search results, for example, may be undesirable since, if a user interacts with such a keyword, a subsequent search may potentially exclude and/or reduce search results that may have been desirable in the previous set of search results. Likewise, a keyterm common to few search results, such as one or two results, may be undesirable since, if a user interacts with such a keyword, it may not exclude and/or reduce enough undesirable search results in a subsequent search. Thus, in certain embodiments, median shared keyterms may be utilized. Of course, the above examples are merely illustrative and, accordingly, the scope of claimed subject matter is not to be limited. As just some additional examples, various other techniques, such as using a most frequent (e.g., mode) shared keyterm, or mean shared keyterms, may be used in various embodiments, as just some examples.

At block 150, a search engine, process, application, and/or the like, may provide one or more shared keyterms to a user's computing platform. For instance, in FIG. 2, a set of shared keyterms is presented on web page 200 as a part of search results in shared keyterms cluster 270. Here, shared keyterms cluster 270 is displayed to a user along with a number which reflects the total number of instances such shared keyterms appear in a plurality of search results. Of course, in certain embodiments, the numbers accompanying the shared keyterms may not be displayed and/or determined.

In certain embodiments, one or more shared keyterms in shared keyterms cluster 270 may comprise as one or more selectable features, such as one or more buttons, hyperlinks and/or other like icons, which may allow a user to interact with one or more displayed shared keyterms. Additionally and/or alternatively, one or more selectable features, such as icon 280, may be representative of one or more shared keyterms, such as one or more shared keyterms displayed in cluster 270, which may be associated with a particular search result. Here, as just an example, icon 280 is depicted as being associated with hyperlink 250. Here, icon 280 may be representative of one or more shared keyterms associated with hyperlink 250. Also, in certain embodiments, one or more shared keyterms associated with a particular search results may be displayed in shared keyterms cluster 270, as just an example.

At block 160, a search engine, process, application, and/or the like, may obtain binary digital signals representing one or more user inputs, such as via a graphical user interface, with one or more shared keyterms. For example, as just described, one or more shared keyterms in shared keyterm cluster 270 may comprise and/or be represented by or associated with one or more selectable features which may allow a user to interact with one or more shared keyterms. Thus, in certain embodiments, a search engine, process, application, and/or the like, may track or obtain binary digital signals representing one or more user's interactions with one or more shared keyterms displayed in cluster 270.

To illustrate, a user may access (e.g., operatively select) the shared keyterm "infect", such as by clicking on the selectable feature labeled "infect", as just an example, and this user's interaction may be tracked and compiled. Similarly, a user may interact with one or more shared keyterms by interacting with one or more selectable features associated with a particular search result, such as icon 280, which here is associated with hyperlink 250. To illustrate, suppose hyperlink 250 is associated with shared keyterms "cells" and "host cells" in shared keyterms cluster 270. A user may interact with icon 280 to interact with one or both of these shared keyterms, as just an example. Of course, the above examples and illustrations are mere exemplary and the scope of claimed subject matter is not to be limited to these examples and illustrations. Furthermore, there exist numerous ways in which one or more users may interact with one or more shared keyterms, which may not involve selectable features, such as buttons, hyperlinks and/or icons. To be clear, all such ways are encompassed within the scope of claimed subject matter.

In certain embodiments, binary digital signals generated by such user interactions may be used in substantially real-time, such as described in more detail below, and/or compiled in a database for later use or analysis. Of course, due to the various environments where such selectable features may be found, a wide range of applications, programs, or apparatuses may operate at the client or server level to track or compile this information, for example.

As suggested above, in certain embodiments, a post-input keyterm identification technique may be utilized. Here, as just an example, arrow 142 in FIG. 1 depicts that after one or more operations depicted at block 130 are performed, at least in part, the operation(s) depicted at block 160 may occur. For example, binary digital signals representing one or more user inputs with one or more selectable features may be obtained. Here, such selectable features may be associated with one or more search results where one or more shared keyterms for such search results may be determined after one or more user inputs. In other words, a process or operation may identify one or more shared keyterms, depicted by arrow 144, after one or more processes or operations obtain binary digital signals representing one or more user inputs. To illustrate, suppose in FIG. 2 that a user interacted with icon 280, which is labeled "less like this". Here, as described above, icon 280 is associated with hyperlink 250 which is associated with keyterms "cells" and "host cells". In a post-input keyterm identification environment, such a user interaction with icon 280 may result in a search program or application obtaining binary digital signals relating to such user inputs. Here, a search application or process may use such binary digital signals to identify one or more shared keyterms among at least a plurality of search results, such as the process(es) or operation(s) depicted at block 140, which may then be used by a process(es) or operation(s) at block 170, as depicted by arrow 146.

At block 170, a search engine, process, application, and/or the like, may use binary digital signals representing one or more user inputs to perform a subsequent or additional search. In certain embodiments, a search performed by a search engine, process, application, and/or the like, at block 170, may be based, at least in part, on one or more user inputs, such as one or more user interactions with one or more selectable features displayed along with a set of search results. Of course, there are a number of ways in which such user inputs may be used in or for a subsequent or additional search. So as not to obscure claimed subject matter however, these ways are not discussed in any detail. For instance, in certain embodiments, a subsequent search may at least in part exclude one or more shared keyterms from one or more search results in that subsequent search. As just some additional examples, such user inputs may be used in a ranking and/or weighting process to modify, alter and/or prune search results. Thus, as just an example, one or more search results associated with one or more shared keywords in a subsequent search may be weighted to reflect user input with respect to those one or more shared keywords, as just an example. Furthermore, in certain embodiments, one or more "excluded" shared keyterms may be displayed, or otherwise presented, to a user in a subsequent search, as just an example.

Users may interact with one or more shared keyterms for various purposes. For example, suppose that a user presented with search results 260 in FIG. 2 is not satisfied with those results and desires different and/or more refined search results. For instance, suppose a user may be trying to obtain search results that relate to "virus" but not to "bacteria." Here, a user may interact with icon 280 if hyperlink 250 relates to "bacteria." As described above, such user interaction with icon 280 may generate binary digital signals which may be tracked or complied to a search engine, process, application, and/or the like. In certain embodiments, a search engine, process, application, and/or the like, may use this information to perform a new, subsequent and/or additional search which may exclude one or more shared keyterms—here, the shared keyterm "bacteria" associated with icon 280. Accordingly, a new, subsequent and/or additional search may produce search results which may not contain the shared keyterm "bacteria" as just an example. Similarly, a user may interact with one or more selectable features representing the shared keyterm "bacteria" in shared keyterm cluster 270.

In certain embodiments, a subsequent search may comprise a search which returns one or more new search results. In certain embodiments, however, a subsequent search may prune one or more search results from an existing set and/or partial set of search results. In such a manner, a user may be able to refine search results to potentially better comport with the user's desired results. At block 180, a search engine, process, application, and/or the like, may provide at least a portion of a next set of search results to a user's computing platform. Also, in certain embodiments, a user may interact with one or more selectable features displayed as a part of a subsequent set of search results, such as described above, to further refine his or her search results, as just an example.

Figure 3:
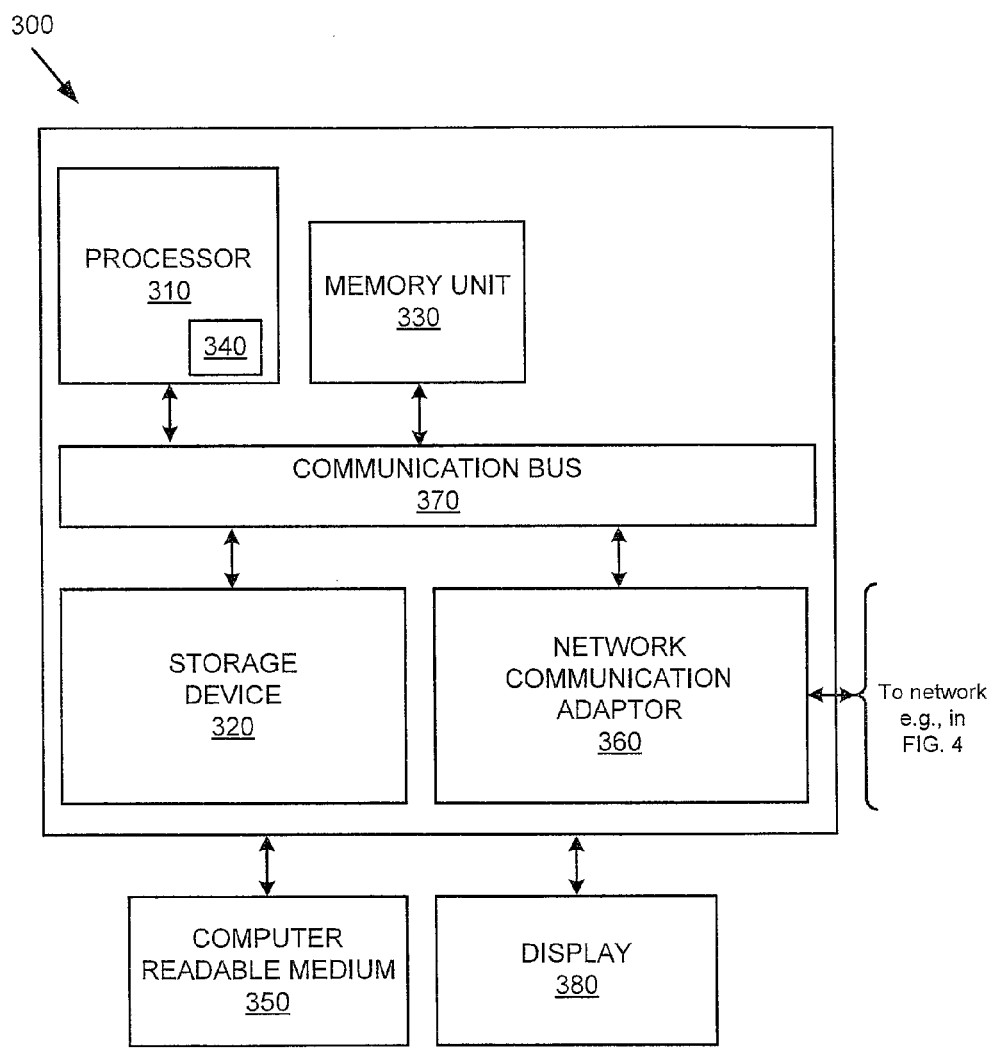
FIG. 3 is a schematic diagram depicting an embodiment of an example apparatus for use in searching information, in accordance with an embodiment.

FIG. 3. a schematic diagram depicting an embodiment 300 of an apparatus for use in searching information, in accordance with an embodiment. Here, apparatus 300 may include a special purpose computing platform, such as a specific client device, and/or the like. Here, apparatus 300 depicts a special purpose computing platform that may include one or more processors, such as processor 310. Furthermore, apparatus 300 may include one or more memory devices, such as storage device 320, memory unit 330, or computer readable medium 350. In addition, apparatus 300 may include one or more network communication adapters, such as network communication adaptor 360. Apparatus 300 may also include a communication bus, such as communication bus 370, operable to allow one or more connected components to communicate under appropriate circumstances.

Figure 4:
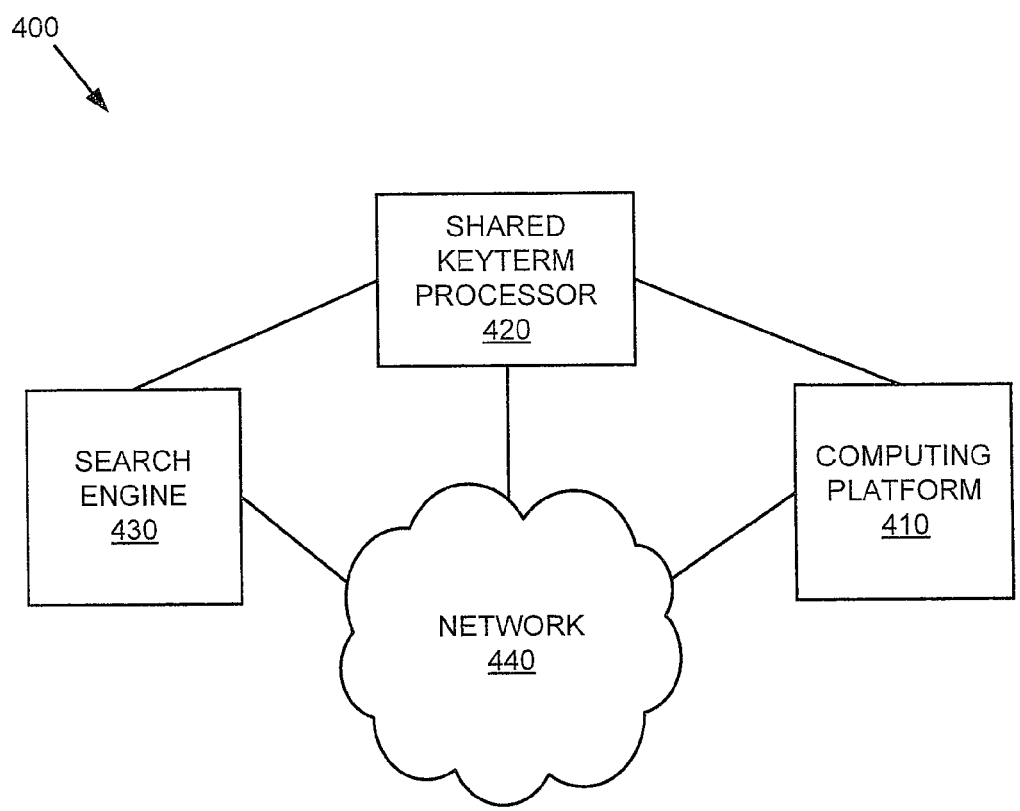
FIG. 4 is a schematic diagram depicting an example system for use in searching information, in accordance with an embodiment.

In an example embodiment, communication adapter 360 may be operable to receive or transmit signals relating to a set of search results or one or more shared keyterms, such as by communicating with network 440 in FIG. 4, for example. In addition, as non-limiting examples, communication adapter 360 may be operable to send or receive one or more binary digital signals representing one or more user's interactions, such as via a graphical user interface, with one or more selectable features associated with one or more shared keyterms, as described previously.

In an example embodiment, shared keyterm processor 340 may be operable to perform one or more processes previously described, such as one or more processes depicted in FIG. 1. In this context, a shared keyterm processor refers to a processor, or other like device, operable to identify one or more keyterms for one or more search results, identify one or more shared keyterms for a plurality of search results, and/or obtain, process, or transmit binary digital signals representing one or more user's interactions or inputs with one or more shared keyterms. For example, in certain embodiments, shared keyterm processor 340 may by operable to identify one or more shared keyterms among at least a plurality of search results or obtain and/or process binary digital signals representing one or more user's interactions with one or more selectable features associated with, and/or at least in part representative of, one or more shared keyterms, as non-limiting examples.

In certain embodiments, apparatus 300 may be operable to transmit or receive information relating to, or used by, one or more process or operations, such as one or more processes mentioned previously, via communication adapter 360, computer readable medium 350, and/or have stored some or all of such information on storage device 320, for example. As an example, computer readable medium 350 may include some form of volatile and/or nonvolatile, removable/non-removable memory, such as an optical or magnetic disk drive, a digital versatile disk, magnetic tape, flash memory, and/or the like. In certain embodiments, computer readable medium 350 may have stored thereon computer-readable instructions, executable code, and/or other data which may enable a computing platform to perform one or more processes or operations mentioned previously.

In certain example embodiments, apparatus 300 may be operable to store information relating to, or used by, one or more operations mentioned previously, such as signals relating to a user's interaction with one or more selectable features associated with, or representative of, one or more shared keyterms in memory unit 330 and/or storage device 320. It should, however, be noted that these are merely illustrative examples and that claimed subject matter is not limited in this regard. For example, information stored or processed, or operations performed, in apparatus 300 may be performed by other components or devices depicted or not depicted in FIG. 3. To illustrate, operations which may be performed by shared keyterm processor 340 may be performed by processor 310 in certain embodiments. Furthermore, operations performed by components or devices in apparatus 300 may be performed in distributed computing environments where one or more operations may be performed by remote processing devices which may be linked via a communication network.

In certain embodiments, apparatus 300 may represent a client computing platform. Here, as just an example, a user which may be using apparatus 300 may interact via a graphical user interface, such as a GUI on display 380, or other interactive devices, such as a keyboard, to input a search query into a search field. In certain embodiments, a program or operation operating at least in part on apparatus 300, such as a desktop search application or other types of search applications, may perform a search and compile a set of search results. Such search results, or portions thereof, may be displayed to a user via display 380, such as described previously, as just an example. Additionally and/or alternatively, network communication adaptor 360 may transmit binary digital signals representing a user's search query to another computing platform, such as a computing platform coupled to network 440 in FIG. 4, as just an example. In certain embodiments, shared keyterm processor 340 may access a plurality of search results obtained from a user's search, such as a plurality of search results compiled at least in part by apparatus 300, and/or a plurality of search results served at least in part to apparatus 300 by one or more computing platforms in network 400, to determine one or more shared keyterms, as just an example. Shared keyterm processor 340 may transmit binary digital signals representing one or more shared keyterms to a search application running at least in part on apparatus 300 so that one or more such shared keyterms may be displayed to a user, such as displayed on display 380, as just an example. In addition, in certain embodiments, shared keyterm processor 340 may access or otherwise obtain binary digital signals representing one or more user's interactions with one or more selectable features associated with one or more shared keyterms. Such signals may be processed at least in part by shared keyterm processor 340 and/or other processors as previously described.

FIG. 4. is a schematic diagram depicting an embodiment of a system for use in searching information, in accordance with an embodiment. In system 400, a computing platform 410 may be communicatively coupled to network 440. Here, in this example, computing platform 410 may be a computing platform associated with one or more users, such as a client device which may be utilized to communicatively couple to network 440. Thus, for example, a user may input a search query or access one or more buttons, hyperlinks or icons associated with one or more shared keyterms that may be transmitted via computing platform 410 and network 440 to search engine 430, as just an example.

System 400 may also include shared keyterm processor 420. Shared keyterm processor 420, which may be associated with search engine 430, for example, may be communicatively coupled to network 440. Additionally or alternatively, shared keyterm processor 420 may be communicatively coupled directly to, or be incorporated into, search engine 430 and/or computing platform 410 in various embodiments. Shared keyterm processor 420, in this example, may access binary digital signals relating to one or more user's interaction with one or more selectable features associated with one or more shared keyterms via computing platform 410, search engine 430, or from other devices or programs which may be communicatively coupled to network 440. Shared keyterm processor 420 may transmit information to, or receive information from, one or more computing platforms communicatively coupled to network 440, such as computing platform 410, search engine 430, or other devices, for example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method comprising:
    identifying, by one or more processors, two or more shared keyterms shared among at least two search results of a set of search results at least partially in response to a particular search query being performed;
    transmitting, to a computing platform, one or more first signals comprising at least a portion of a set of search results for said particular search query and visual indicators for two or more of said two or more shared keyterms to indicate a frequency of occurrence of said two or more shared keyterms within said at least two search results;
    obtaining one or more second signals representing a selection, made via one or more user inputs, of one or more selectable features associated with said two or more shared keyterms; and
    performing a search based at least partially on said selection.

2. The method of claim 1, further comprising:
    transmitting one or more of said shared keyterms as a part of said set of search results.

3. The method of claim 1, wherein said selection is based at least in part on one or more interactions with one or more said selectable features displayed as a part of said set of search results.

4. The method of claim 1, further comprising:
    transmitting at least a portion of a subsequent set of search results;
    said portion being determined based, at least in part, on said selection.

5. The method of claim 1, wherein said identifying comprises iterating over a plurality of search results of at least a portion of said set to identify said one or more keyterms shared among at least said plurality of said at least two of said search results.

6. The method of claim 1, wherein said identifying is performed prior to said obtaining said one or more second signals representing said selection.

7. The method of claim 1, wherein said identifying is performed after said obtaining said one or more second signals representing said selection.

8. The method of claim 7, further comprising:
    using said one or more second signals at least in part to identify said one or more shared keyterms among at least a plurality of search results.

9. The method of claim 1, further comprising:
    determining a number of instances a particular shared keyterm occurs among at least said plurality of search results.

10. The method of claim 1, wherein at least one of said shared keyterms comprises a median keyterm for a plurality of shared keyterms corresponding at least in part to a particular search result.

11. The method of claim 1, wherein one or more of said search results comprises one or more documents, files, or hyperlinks associated with one or more web pages, at least in part.

12. The method of claim 1, wherein said one or more selectable features comprises one or more buttons, icons, or hyperlinks, at least in part.

13. The method of claim 1, wherein the visual indicators comprise a display of at least one number indicating said frequency of occurrence.

14. A system, comprising:
    a first computing platform, comprising one or more processors, capable of:
        identifying two or more shared keyterms shared among at least two search results of a plurality of search results at least partially in response to a particular search query being performed;
        processing binary digital signals representing a selection, made via one or more user inputs, of one or more selectable features associated with one or more shared keyterms, said one or more selectable features comprising visual indicators for two or more of said two or more shared keyterms to indicate a frequency of occurrence of said two or more shared keyterms within said at least two search results;
        performing a search based, at least in part, on said selection; and
        transmitting at least a portion of said set of search results to at least one second computing platform.

15. The system of claim 14, wherein said first computing platform and said second computing platform are communicatively coupled via a network.

16. The system of claim 15, wherein said network comprises at least a part of an Internet or Intranet.

17. The system of claim 14, wherein said first computing platform or said second computing platform is capable of determining a number of instances a particular shared keyterm occurs among said plurality of said search results.

18. The system of claim 14, wherein said at least one of said shared keyterms comprises a median, mean, or mode shared keyterm.

19. An apparatus, comprising:
a special purpose computing platform further comprising:
   a shared keyterm processor to:
      identify two or more shared keyterms shared among at least two search results of a set of search results at least partially in response to a particular search query being performed;
      process binary digital signals representing one or more user inputs representing a selection of one or more selectable features associated with said one or more shared keyterms, said one or more selectable features comprising visual indicators for two or more of said two or more shared keyterms to indicate a frequency of occurrence of said two or more shared keyterms within said at least two search results; and
      perform a search based, at least in part, on said selection.

\* \* \* \* \*